United States Patent

Kerrand et al.

[11] Patent Number: 5,387,471
[45] Date of Patent: Feb. 7, 1995

[54] WEAR-RESISTANT COATING FOR A NICKEL ALLOY PART

[75] Inventors: Emmanuel Kerrand, Villabe; Vincent Le Castrec, Charenton le Pont; Didier Boucachard, Belfort, all of France

[73] Assignee: European Gas Turbines SA, Paris, France

[21] Appl. No.: 111,921

[22] Filed: Aug. 26, 1993

[30] Foreign Application Priority Data

Aug. 27, 1992 [FR] France .................. 92 10317

[51] Int. Cl.$^6$ .............................................. B22F 7/04
[52] U.S. Cl. ............................ 428/553; 428/546; 428/547; 428/548; 428/554
[58] Field of Search .............. 428/546, 547, 548, 533, 428/554; 427/405, 42, 34, 248.1; 134/3

[56] References Cited

U.S. PATENT DOCUMENTS

| | | | |
|---|---|---|---|
| 4,024,294 | 5/1977 | Rairden, III | 427/42 |
| 4,198,442 | 4/1980 | Gupta et al. | 427/34 |
| 4,219,592 | 8/1980 | Anderson et al. | 427/405 |
| 4,371,570 | 2/1983 | Goebel et al. | 427/248.1 |
| 4,447,503 | 5/1984 | Dardi et al. | 428/632 |
| 4,530,885 | 7/1985 | Restall | 428/670 |
| 4,944,807 | 7/1990 | Sova | 134/3 |
| 5,034,284 | 7/1991 | Bornstein et al. | 428/680 |
| 5,035,957 | 7/1991 | Bartlett et al. | 428/552 |

FOREIGN PATENT DOCUMENTS 1222506 6/1960 France.

OTHER PUBLICATIONS

Japanese Patent Abstract 55-82775 dated Jun. 21, 1980.
LU-A-62 814—French Article.
French Search Report 9210317 dated Jun. 9, 1993.

Primary Examiner—Donald P. Walsh
Assistant Examiner—John N. Greaves
Attorney, Agent, or Firm—Sughrue, Mion, Zinn, Macpeak & Seas

[57] ABSTRACT

A coating for a part made of a nickel alloy of the following type: Cr: 15% to 20%, Co: 8% to 20%, Mo: 1.5% to 4%, Ti: 3% to 5%, Al: 3% to 3.5%, W: $\leq$3.8%, Fe: $\leq$1.2%, Nb: $\leq$0.9%, C: $\leq$0.1%, B: $\leq$0.01%, and Ta: $\leq$2.8%, the remainder being Ni, the coating having hardness of about 400 HV and including a plurality of layers (5', 5'') of a wear-resistant cobalt-containing material of the following type: C: <1%, Cr: 26% to 30%, W: 18% to 21%, Ni: 4% to 6%, V: 0.75% to 1.15%, Fe: $\leq$3%, Mn $\leq$1%, Si: $\leq$1%, and B: $\leq$0.05%, the remainder being Co, said coating being characterized in that a buffer layer (5) is disposed between the part and the cobalt-containing layers (5', 5''), which buffer layer is made from a pre-alloyed powder having the following composition: Si: 0.7% to 2.9%, Cr: 11% to 26%, Fe: 0.5% to 3%, C: 0.35% to 0.85%, B: 0.3% to 1.35%, Ni: 20% to 69%, W: 3.6% to 16.8%, Mn $\leq$0.8%, and Co: 7% to 41.5%. The low-hardness region is reduced or is omitted.

2 Claims, 2 Drawing Sheets

WEAR-RESISTANT COATING FOR A NICKEL ALLOY PART

The present invention relates to a coating for a part made of a nickel alloy of the following type: Cr: 15% to 20%, Co: 8% to 20%, Mo: 1.5% to 4%, Ti: 3% to 5%, Al: 3% to 3.5%, W: ≦3.8%, Fe: ≦1.2%, Nb: ≦0.9%, C: ≦0.1%, B: ≦0.01%, and Ta: ≦2.8%, the remainder being Ni, the coating having hardness of about 400 HV and including a plurality of layers of a wear-resistant cobalt-containing material of the following type: C: <1%, Cr: 26% to 30%, W: 18% to 21%, Ni: 4% to 6%, V: 0.75% to 1.15%, Fe: ≦3%, Mn ≦1%, and Si: ≦1%, the remainder being Co.

The parts to be coated are, in particular, gas turbine blades, especially the inverted Z shaped notches therein.

The coating may be deposited by laser as indicated in French Patent Application 92-03459 filed in the name of the Applicant.

Depositing the cobalt-containing layers causes the material of the substrate to mix with the material of the coating, as a result of which a low-hardness region develops.

The coating of the invention that enables this low-hardness region to be made smaller or to be omitted is characterized in that a buffer layer is disposed between the part and the cobalt-containing layers, which buffer layer is made from a pre-alloyed powder having the following composition: Si: 0.7% to 2.9%, Cr: 11% to 26%, Fe: 0.5% to 3%, C: 0.35% to 0.85%, B: 0.3% to 1.35%, Ni: 20% to 69%, W: 3.6% to 16.8%, Mn ≦0.8%, and Co: 7% to 41.5%.

The present invention will be better understood on reading the following description given with reference to the accompanying drawings, in which.

The make-up of the nickel alloy of the blade is as follows: Cr: 14%, Co: 9%, Mo: 5%, Ti: 4.9%, Al: 3%, W: 3.8%, Fe: 0%, C: 0.1%, B: 0.01%, and Ta: 2.8%, the remainder being Ni.

Layers 5', 5" and the layers overlaying them are based on cobalt, and are obtained from a powder having the following composition: Cr: 28%, W: 19.5%, Ni: 5%, V: 1%, C: 0.9%, B: 0.05%, and Mn: 0.5%, the remainder being cobalt.

In accordance with the invention, the first layer 5 to be deposited is a buffer layer obtained from a mixture powder based on Ni and of powder based on Co.

The composition of this powder mixture is as follows: Si: 2.3%, Cr: 17.8%, Fe: 2.7%, C: 0.6%, B: 0.85%, W: 10.5%, Mn: 0.5%, and Co: 18.2%, the remainder being Ni.

Layer 5 preferably follows the contour of the part, and layers 5', 5" and the following layers are preferably plane.

The wear-resistant coating has no cracks, and the metallic bonding between it and the substrate made of nickel alloy is good.

Figure 1:
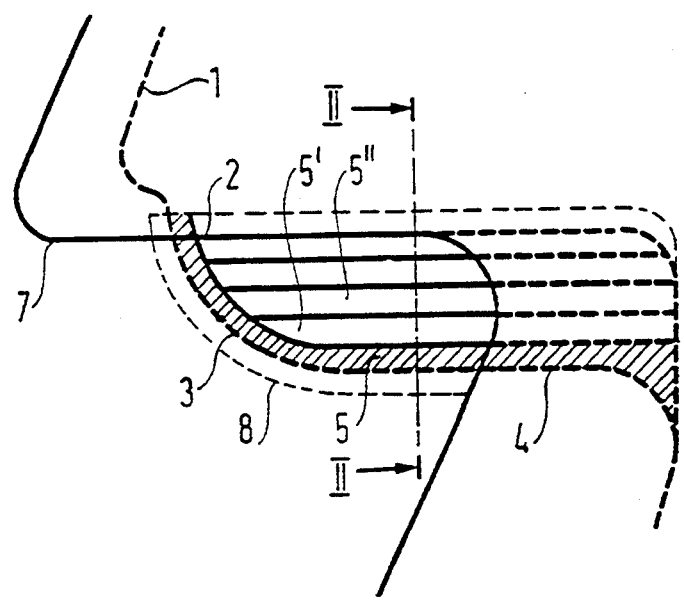
FIG. 1 is a cross-section through the coating deposited on the part.
Figure 2:
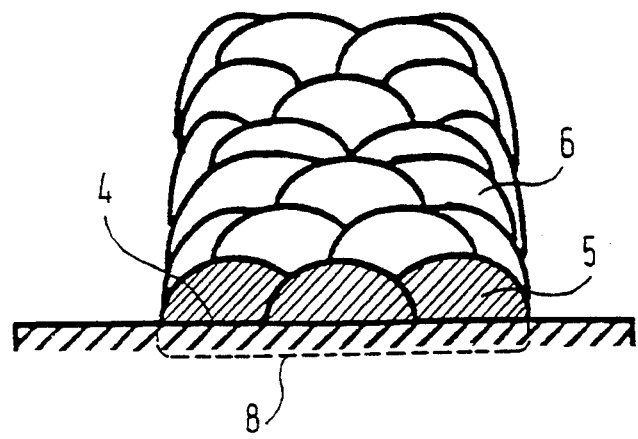
FIG. 2 is a longitudinal section taken on II—II through the coating deposited on the part.

The Z-shaped assembly is then machined again so as to obtain the final profile 7 shown by a solid line in FIG. 1.

When layer 5 and the following layers are being deposited, that portion of the part which is in contact with the layers is affected, and the substrate material mixes with the layer material. The depth of the affected layer 8 of the substrate is approximately in the range 0.2 mm to 0.5 mm, and the depth of each of the deposited layers 5, 5', 5", etc. is approximately in the range 0.2 mm to 0.6 mm.

Figure 3:
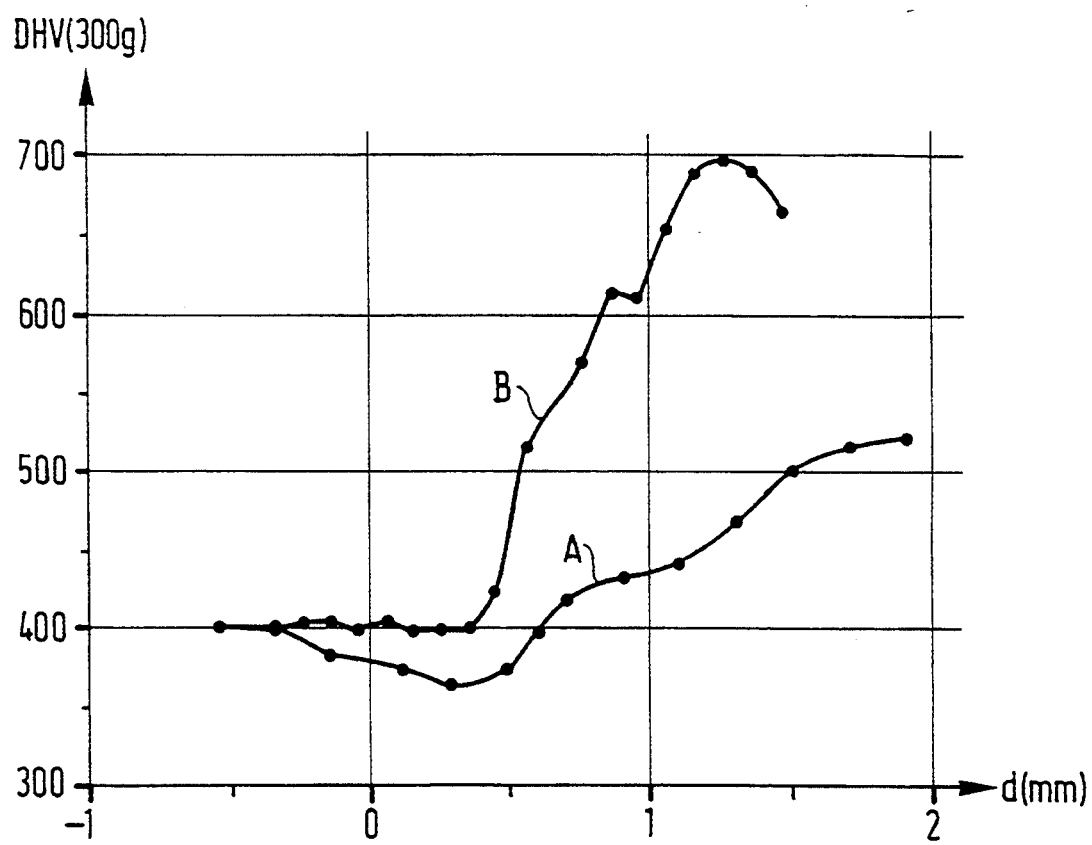
FIG. 3 shows the variation in hardness when the coating does not include a buffer layer, and when the coating includes a buffer layer of the invention.

When the hardness of the metal is tested after cutting a section on dashed line II—II, curves A, and B in FIG. 3 are obtained. Curve A corresponds to layer 5 being obtained using the same cobalt-containing powder as the following layers, and curve B corresponds to layer 5 being a buffer layer, i.e. as in the invention. Distance d in mm is given along the x-axis, with the point 0 corresponding to penetration into the layer 8.

Hardness D (HV. under 300 g) is given up the y-axis. It can be observed that, with curve A, the hardness drops from 400 HV to 360 HV, whereas there is no drop in hardness with curve B.

We claim:

1. A coating for a part made of a nickel alloy of the following type: Cr: 15% to 20%, Co: 8% to 20%, Mo: 1.5% to 4%, Ti: 3% to 5%, Al: 3% to 3.5%, W: ≦3.8%, Fe: ≦1.2%, Nb: ≦0.9%, C: ≦0.1%, B: ≦0.01%, and Ta: ≦2.8%, the remainder being Ni, the coating having hardness of about 400 HV and including a plurality of layers (5', 5") of a wear-resistant cobalt-containing material of the following type: C: <1%, Cr: 26% to 30%, W: 18% to 21%, Ni: 4% to 6%, V: 0.75% to 1.15%, Fe: ≦3%, Mn ≦1%, Si: ≦1%, and B: ≦0.05%, the remainder being Co, said coating being characterized in that a buffer layer (5) is disposed between the part and the cobalt-containing layers (5', 5"), which buffer layer is made from a pre-alloyed powder having the following composition: Si: 0.7% to 2.9%, Cr: 11% to 26%, Fe: 0.5% to 3%, C: 0.35% to 0.85%, B: 0.3% to 1.35%, Ni: 20% to 69%, W: 3.6% to 16.8%, Mn ≦0.8%, and Co: 16% to 41.5%.

2. A coating according to claim 1, characterized in that the composition of the powder used to make the buffer layer (5) is as follows: Si: 2.3%, Cr: 17.8%, Fe: 2.7%, C: 0.6%, B: 0.85%, W: 10.5%, Mn: 0.5%, and Co: 18.2%, the remainder being Ni.

* * * * *